(12) United States Patent
Burstyn

(10) Patent No.: US 6,561,649 B1
(45) Date of Patent: May 13, 2003

(54) COMPACT REAR PROJECTION SYSTEM USING BIREFRINGENT OPTICS

(75) Inventor: Herschel Clement Burstyn, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/611,707

(22) Filed: Jul. 7, 2000

Related U.S. Application Data

(60) Provisional application No. 60/143,058, filed on Jul. 9, 1999.

(51) Int. Cl.[7] .......... G03B 21/00; G03B 21/14; G03B 21/28; G03B 21/60; G03B 26/08
(52) U.S. Cl. .............. 353/8; 353/20; 353/69; 353/78; 359/207; 359/457; 359/458
(58) Field of Search ............... 353/8, 20, 74, 353/77, 78, 69; 359/458, 207, 457

(56) References Cited

U.S. PATENT DOCUMENTS

| | | | | |
|---|---|---|---|---|
| 4,116,540 A | * | 9/1978 | Thomas | 350/293 |
| 4,944,656 A | | 7/1990 | Feng et al. | 116/173 |
| 4,969,732 A | | 11/1990 | Wright et al. | 353/77 |
| 5,019,807 A | | 5/1991 | Stapleton et al. | 345/206 |
| 5,179,440 A | | 1/1993 | Loban et al. | 348/383 |
| 5,333,072 A | | 7/1994 | Willet | 349/6 |
| 5,467,154 A | | 11/1995 | Gale et al. | 353/119 |
| 5,573,321 A | * | 11/1996 | De Vaan | 353/77 |
| 5,573,324 A | * | 11/1996 | De Vaan | 353/77 |
| 5,613,748 A | | 3/1997 | Yoshida et al. | 353/74 |
| 5,639,151 A | | 6/1997 | McNelley et al. | 353/98 |
| 5,741,057 A | | 4/1998 | Goldberg et al. | 353/74 |
| 5,751,464 A | * | 5/1998 | Yoshikawa et al. | 359/208 |
| 5,818,645 A | * | 10/1998 | Whaley et al. | 359/668 |
| 5,833,339 A | * | 11/1998 | Sarayeddine | 353/20 |
| 5,879,037 A | | 3/1999 | De Vaan | 353/98 |
| 5,879,067 A | * | 3/1999 | De Vaan | 353/98 |
| 5,930,020 A | * | 7/1999 | Dewald | 359/670 |
| 5,930,050 A | * | 7/1999 | Dewald | 359/670 |
| 5,975,703 A | | 11/1999 | Holman et al. | 353/20 |
| 5,995,268 A | | 11/1999 | Shiraishi et al. | 359/204 |
| 6,012,816 A | | 1/2000 | Beiser | 353/122 |
| 6,023,369 A | | 2/2000 | Goto | 359/443 |
| 6,046,847 A | | 4/2000 | Takahashi | 359/457 |
| 6,052,226 A | | 4/2000 | Takahashi | 359/457 |
| 6,061,178 A | | 5/2000 | Park | 359/457 |
| 6,181,386 B1 | * | 1/2001 | Knox | 348/788 |
| 6,185,038 B1 | | 2/2001 | Yamaguchi et al. | 359/457 |
| 6,211,932 B1 | | 4/2001 | Iigahama et al. | 349/95 |
| 6,233,024 B1 | * | 5/2001 | Hiller et al. | 348/744 |
| 6,275,334 B1 | * | 8/2001 | Park | 359/449 |
| 6,318,862 B1 | * | 11/2001 | Sarayeddine | 353/20 |
| 6,375,327 B2 | * | 4/2002 | Holman et al. | 353/20 |
| 6,406,150 B1 | * | 6/2002 | Burstyn | 353/69 |

FOREIGN PATENT DOCUMENTS

| | | | |
|---|---|---|---|
| EP | 0 783 133 | 7/1997 | G03B/21/60 |
| EP | 0 884 898 | 12/1998 | H04N/5/74 |

OTHER PUBLICATIONS

Weber, Michael F. et al., "Giant Birefringent Optics in Multilayer Polymer Mirrors", Science, vol. 287, Mar. 31, 2000, pp. 2451–2455.

Service, Robert F., "Mirror Film is the Fairest of Them All", Mar. 31, 2000, vol. 287, pp. 2380–2381.

Fink, Yoel et al., "A Dielectric Omnidirectional Reflector", Science, vol. 282, pp. pp. 1679–1682.

* cited by examiner

*Primary Examiner*—Russell Adams
*Assistant Examiner*—Magda Cruz
(74) *Attorney, Agent, or Firm*—William J. Burke

(57) ABSTRACT

A rear projection system provides for reduced cabinet depth by folding the optical path with polarization sensitive mirrors. In one aspect, the projector outputs linearly polarized light to a quarter-wave polarizing sheet, which circularly polarizes the projector output. A mirror directs the projected light back through the quarter-wave material to a polarization-dependent reflector. The light has a reflective polarization state. The polarization-dependent reflector reflects the light back to the quarter-wave material and mirror. Upon traversing the path a second time, the light is in a transmissive polarization state.

24 Claims, 3 Drawing Sheets

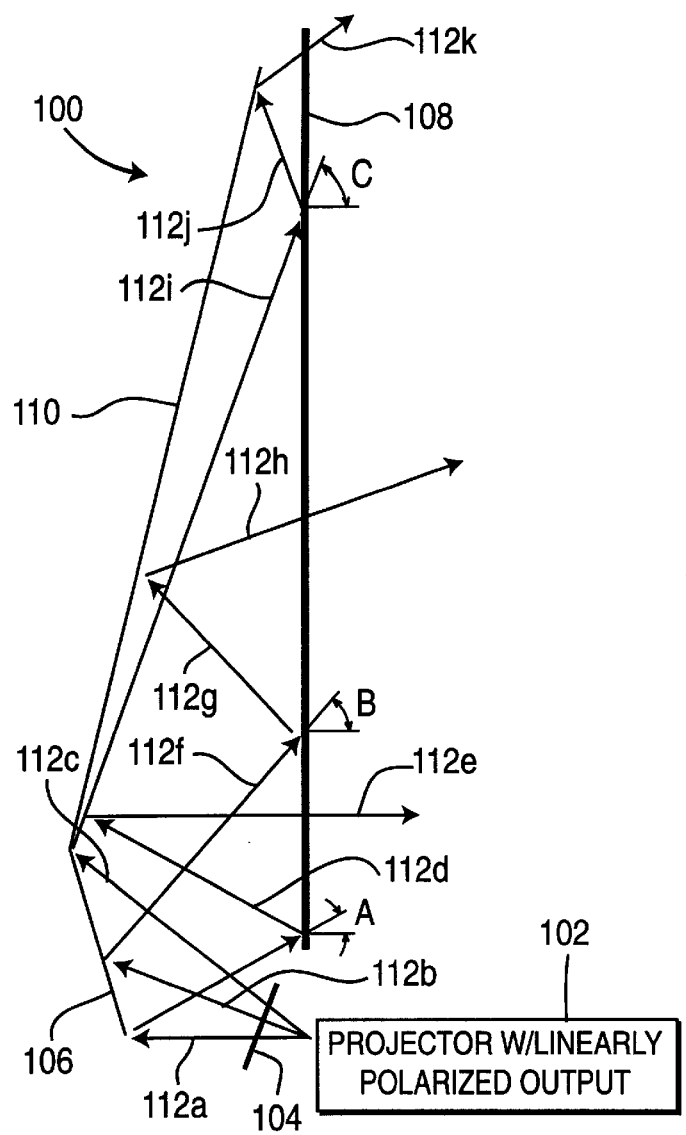
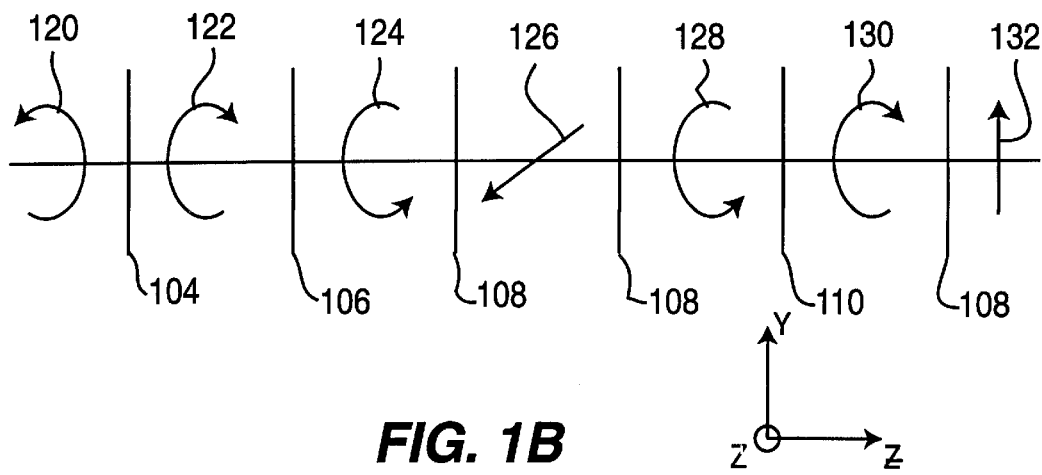
FIG. 1A
FIG. 1B

COMPACT REAR PROJECTION SYSTEM USING BIREFRINGENT OPTICS

CROSS-REFERENCE TO RELATED APPLICATIONS

This application claims priority from U.S. Provisional Patent Application No. 60/143,058, entitled "Compact Rear Projection System Based upon a Curved Turning Mirror and Anamorphic Projection" filed Jul. 9, 1999, which is incorporated herein by reference.

FIELD OF THE INVENTION

This invention relates to rear projection systems, and more particularly to compact rear projection systems using polarization sensitive designs.

BACKGROUND

Rear projection systems typically comprise some type of image generation source, optics to enlarge and direct the image and a transmission screen for displaying the enlarged image. The image source can be of many different types, including cathode-ray tubes and LCD projectors. In simple systems, the optics generally includes a lens, such as a combined convex glass lens element and a methacrylic resin lens element, and a turning mirror for directing the image toward the screen. The transmission screens generally include diffusing material, lenticular lens sheets and Fresnel lens sheets, and are intended to project a wide image with uniform brightness.

In one rear projection system configuration, the image source is positioned behind the transmission screen and directed at an angle away from the screen and toward the turning mirror. The image source provides a small, bright image to the projecting lens, which enlarges the image and directs it to the reflective surface of the turning mirror. The turning mirror reflects the image to the transmission screen for transmission to the viewing audience.

The depth dimension of rear projection systems like the one described above is constrained by the angle of incidence on the screen's Fresnel lens. To make a compact rear projection package, a short focal length lens is required. A decreasing focal length resulting from decreasing cabinet depth increases the field of view as measured at the screen. As the field of view increases, the angles of incidence in air and within the Fresnel lens eventually approach the critical angle, causing transmission to drop to zero. Even before the angle of incidence approaches the critical angle, the perpendicular and parallel polarization transmission coefficients diverge. A divergence in polarization transmission coefficients results in image distortions, such as non-uniformity in brightness across the screen.

Recently there has been research into the use of birefringent optics in optical systems, including their use to produce polarization-dependent elements and multilayer polymer mirrors. These elements reportedly exhibit extinction ratios as high as 300:1, wide-angle acceptance, and bandwidth selectability in the visible range. Nevertheless, currently available materials are polarization orientation sensitive, and have not experienced widespread use in rear projection systems.

SUMMARY OF THE INVENTION

A rear projection system according to the principles of the invention provides for reduced cabinet depth by folding the optical path with polarization-dependent reflectors and retardation material. In one aspect, the projector outputs linearly polarized light to a quarter-wave polarizing sheet. The quarter-wave sheet circularly polarizes the projector output. A turning mirror then directs the projected light to a screen having a layer of quarter-wave material, a polarization-dependent reflecting film and an off-axis Fresnel lens. The circularly polarized light, upon passing through the screen's layer of quarter-wave material, becomes linearly polarized and is reflected by the polarization-dependent reflecting film. After reflection, the screen's quarter-wave material again circularly polarizes the light. The circularly polarized light is directed back to the screen by a second mirror, where the screen's quarter-wave material causes the light to again become linearly polarized. The polarization-dependent film passes the linearly polarized light to the off-axis Fresnel lens. In this manner, the optical path is folded such that the incident angle on the Fresnel lens is a projection quality angle (for example, an angle less than the Brewster angle).

In another system according to the invention, the optical path includes a turning mirror that directs a scanning point source projection to a quarter-wave retardation film bonded to a birefringent mirror. The quarter-wave material manipulates the polarization state and the mirror reflects the light to a polarization-dependent reflector. The reflector initially reflects the light. Once the light traverses the quarter-wave material and mirror a second time, the polarization state is transmissive. A collimator and light control film compensate for the effects of any light leaking through the polarization operative elements.

BRIEF DESCRIPTION OF THE DRAWINGS

A more complete understanding of the invention can be obtained from the following description in conjunction with the drawings, in which:

FIGS. 1A and 1B show a ray trace and polarization state diagram respectively for a rear projection system according to the principles of the invention;

DETAILED DESCRIPTION

Figure 2:
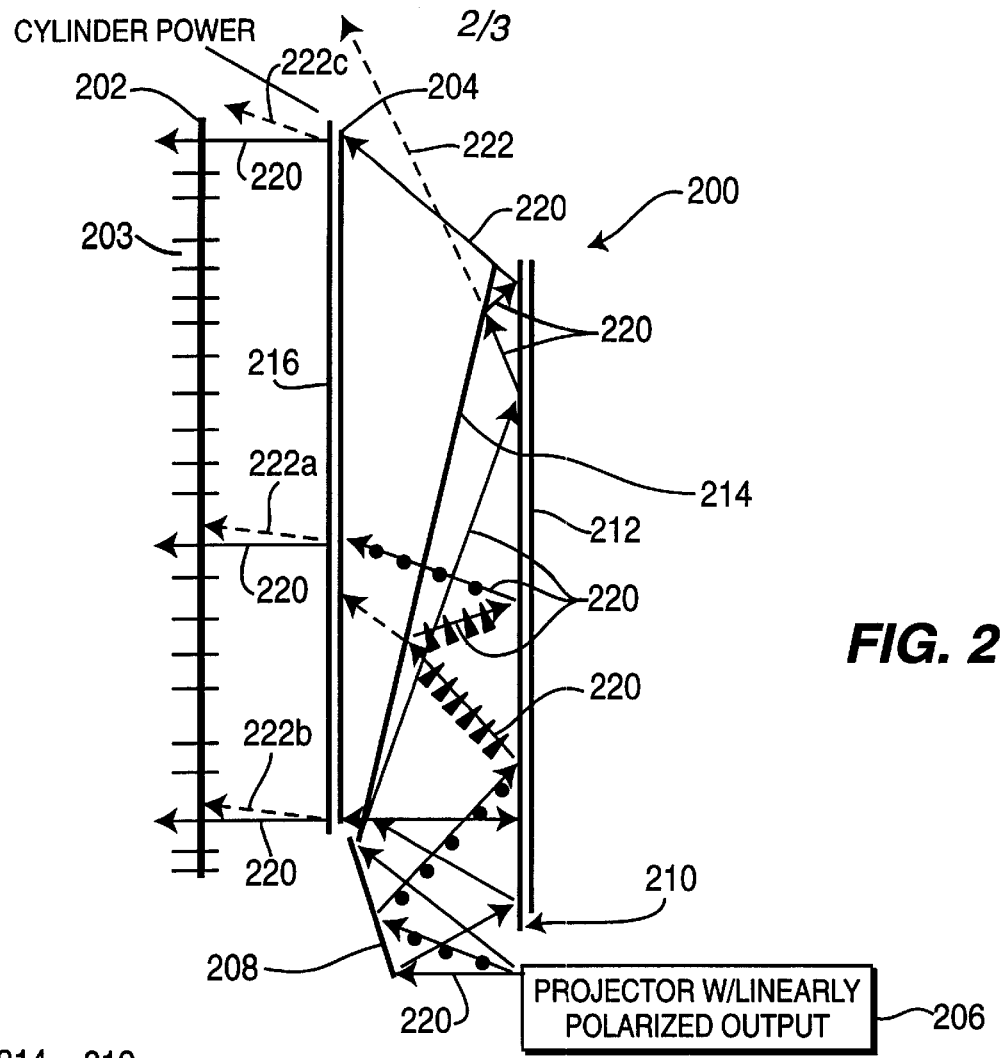
FIG. 2 shows a projection system according to the principles of the invention.

A projection system according to the principles of the invention provides for reduced cabinet depths in comparison to known projection systems. Projected images traverse a folded optical path such that light is incident on the transmission screen at a projection quality angle (for example, having a magnitude less than the Brewster angle). In one embodiment, a polarization-dependent reflector acts as a mirror in the optical path for light of a particular polarization state. After the polarization-dependent reflector reflects the projected light, the polarization state is manipulated to a transmissible polarization state. The projected image can then pass through the polarization-dependent reflector to the transmission screen and then to the viewing audience. Due to the geometry of the optical path, the light incident on the transmission screen is a projection quality incident angle.

FIG. 1A illustrates a ray trace 100 for a rear projection system according to the principles of the invention. The projection system includes an image projector 102, mirrors 106 and 110 and a transmission screen 108. The projection image rays 112(*a–l*) are shown as arrows on the ray trace 100. The projection system also includes a quarter-wave polarizer 104. In operation, the projector 102 projects an image in the direction of the turning mirror 106. The projected image is shown as rays 112(*a–c*) leaving the projector 102 in the direction of the mirror 106. The quarter-wave material 104 is interposed between the projector 102 and the turning mirror 106, and the projected image rays 112(*a–c*) pass through the quarter-wave material 104 before striking the reflective surface of the turning mirror 106. Upon passing through the quarter-wave material 104, the projected light 112(*a–c*) becomes circularly polarized.

The turning mirror 106 directs the projected images toward the transmission screen 108. The rays 112(*f, i* and *l*) leaving the turning mirror 106 remain circularly polarized but have a handedness opposite to that of the rays incident on the mirror 106. The departing rays are incident on the transmission screen 108. The transmission screen 108 includes a layer of quarter-wave polarizing material and a layer of polarization-dependent reflective material. Upon passing through the screen's quarter-wave material, the projected rays 112(*f, i* and *l*) again become linearly polarized. The polarization state is such that the screen's polarization-dependent reflective material reflects this light. On the ray trace, these reflected rays 112(*d, g* and *j*) are directed from the transmission screen toward the second mirror 110.

The light reflected from the polarization-dependent reflector passes through the sheet of quarter-wave material, which circularly polarizes the light, prior to striking the second mirror 110. The second mirror 110 changes the handedness of the polarization and directs this light 112(*e, h* and *k*) back toward the transmission screen 108. At the transmission screen 108, the image again strikes the screen's layer of quarter-wave material, which linearly polarizes the light. In this instance, the polarization state is such that the screen's polarization-dependent material is transmissive, rather than reflective, and the rays are transmitted to the viewing audience.

As illustrated by the ray trace 100, the optical elements are used to create an optical folder that permits a shallower cabinet depth than in conventional rear projection systems. In a conventional system, the image rays (112*f, i* and *l*) are incident on the transmission screen 108 at angles A, B and C. The incident angle C, measured from the normal to the transmission screen, is greater than A. As the field of view increases, the incident angle increases. Using the optical folder described above, the optical path is folded such that the incident angle for substantially all the image rays is equal to or less than a projection quality incident angle. For example, a system having the above optical folder can achieve a sixty inch diagonal screen with a 4:3 aspect ratio at a cabinet depth of 10.2 inches, while maintaining projection quality incident angles.

FIG. 1B is a polarization state diagram illustrating exemplary polarization states corresponding to the ray trace 100 of FIG. 1A. The light leaving the projector is linearly polarized, as represented by the polarization state symbol 120. The light is shown having a plane of vibration in the Y axis. This light passes through the quarter-wave material 104, which circularly polarizes the light. In the diagram, this is shown as a right-handed circular polarization state symbol 122, which indicates the polarization and handedness of the polarization. This circularly polarized light strikes the turning mirror 106, which reflects the light as left-handed circularly polarized light 124. The reflected light strikes the quarter-wave material on the transmission screen 108. This quarter-wave material linearly polarizes the light, as shown by the linear polarization state symbol 126. In this case, however, the light is polarized in a different plane of vibration 126 then the projector light 120.

The linearly polarized light is reflected by the polarization-dependent material in the transmission screen 108 and again passes through the quarter-wave material in the screen 108. The quarter-wave material circularly polarizes the light 128. The second mirror 110 reflects this circularly polarized light, changing the handedness of the polarization 130. The mirror 110 directs this light toward the screen 108 where it again strikes the quarter-wave material. The quarter-wave material linearly polarizes the light 132. The plane of vibration in this polarization state 132 is such that the polarization-dependent reflector is transmissible. The light passes through the material and the transmission screen to the viewing audience.

In the optical system shown in FIG. 1A, the projector can be any source capable of projecting light. The mirrors 106 and 110 can be conventional mirrors, such as a mylar film mirror stretched over a metal frame, or, as will be explained hereafter, the mirrors can be dielectric mirrors. The screen 108 can be composed of multiple layers, including lenticular lens layers and Fresnel lens layers, in addition to the materials described above. The polarization-dependent layer can be 3M reflective polarizer material or 3M's DBEF material. The quarterwave polarization material can be any of a number of known polarizing materials or retardation films for use in optical systems.

FIG. 2 shows another rear projection system 200 according to the principles of the invention. In this system, a light control film 202 and a collimator 204 are used to reduce ghosting and scatter. In addition, there is only one sheet of quarter-wave material 210, and the quarter-wave material 210 and polarization-dependent reflector 214 are not part of the screen 216. As in the system of FIG. 1, the projector 206 and mirrors 208 and 212 can be conventional mirrors or dielectric stacks. The solid 220 and broken 222 arrows indicate ray traces, where the solid arrows show the desired light travel of the system 200 and where the broken arrows indicate leakage from the polarization-dependent reflector 214 and the quarter-wave material 210. Leakage may arise because a realization of the retardance characteristics of these elements is angle and wavelength dependent.

In operation, the projector 206 outputs linearly polarized light 220, which is reflected by the turning mirror 208 toward the quarter-wave material 210 and the second mirror 212. The quarter-wave material 210 circularly polarizes the light, and the mirror 212 reflects the light toward the polarization-dependent reflector 214. The handedness of the light changes when reflected by the mirror 212, and the quarter-wave material changes the polarization state to linear. The polarization-dependent reflector 214 reflects the light back to the quarter-wave material 210 and mirror 212. As shown by broken rays 222*a* and *b*, however, some light is not reflected due to the characteristics of the polarization operative elements 210 and 214. These rays transmit to the screen 216. The reflected light 220 traverses the folding path again, and the polarization state becomes transmissive by the polarization-dependent reflector 214.

For the system 200 of FIG. 2, the light 222*a–c* that leaks through the polarization-dependent reflector 214 is incident at a significantly different angle than the light 220 that again traverses the folding path. A collimator 204 and light control film 202 operate to reduce the artifacts that can be caused by the mirror and quarter-wave material realization. The light control film 202 operates to absorb light incident at unwanted angles. For purposes of explanation, the film 202 is shown having slats 203 made of light-absorbing material. Light striking the slats is absorbed. The collimator 204, which can be a cylindrical lens, collimates the desired light 220 to the acceptance angle of the light control film 202. In this configuration, the light control film 202 can be interposed between one of the Fresnel lenses in the screen and a diffusing or scattering surface. Light control films of suitable characteristics are known, such as light control films manufactured by 3M Corp. Negative birefringence films also can be used to correct for phase shifts introduced by the polarization operative elements (similar to their use in LCD panels).

The quarter-wave material 210 in FIG. 2 can have broad angle and broad bandwidth capabilities. A broad angle film can be constructed from liquid crystal material and negative birefringent corrector films. Liquid crystals (LC) can act as birefringent agents. For example, combining LC material with binders yields an adjustable retardation material. Electric fields are used to cure the binders, fixing the LC's molecular orientation and, therefore, the material's retardation. The binder can be an ultraviolet light curable polymer. Negative birefringent corrector films, such as those used in LCD displays, can be combined with the LC retardation film to make the film broad angle.

The retardation characteristic of LC material is a function of the angle of incidence. In the fold system of FIG. 2, the angle of incidence on the quarter-wave material 210 is a function of position; however, in small regions the angle of incidence to the quarter-wave material 210 varies only slightly. The retardance characteristic of the LC material can be tailored point by point for the mean of local angles of incidence. This sets the retardance characteristic for a specific center wavelength and a range of angles about the local mean for the incident light. The LC material characteristic for light reflected from the mirror 212 can be calculated for a separate sheet prepared in the same manner. The retardance characteristic of the incident film is then adjusted to account for the effect of the second film by subtracting the contribution of the second film for light incident at the angle of reflection. The retardance of the second film is likewise adjusted by subtracting the contribution of the first film for light incident at the angle of incidence. The sheets can be laminated to form a "bi-film" optimized for the local range of angles.

The "bi-film" can be effectively bonded to the second mirror 212 in the system 200 of FIG. 2. To implement the "bi-film" with a dielectric mirror, the film is optimized for some wavelength, such as blue light. The film can then be bonded to a mirror produced using Giant Birefringent Optics (GBO) reflective in the blue region but transmissive in the red and green. Two additional "bi-film" layers are then prepared with retardance adjusted for the green band and red band respectively, with appropriate backing mirrors reflective in the proper wavelength. The result is a dielectric stack that implements appropriate retardance and reflection characteristics for the desired wavelengths of light and for the range of angles in the projection system.

Figures 3A, 3B:
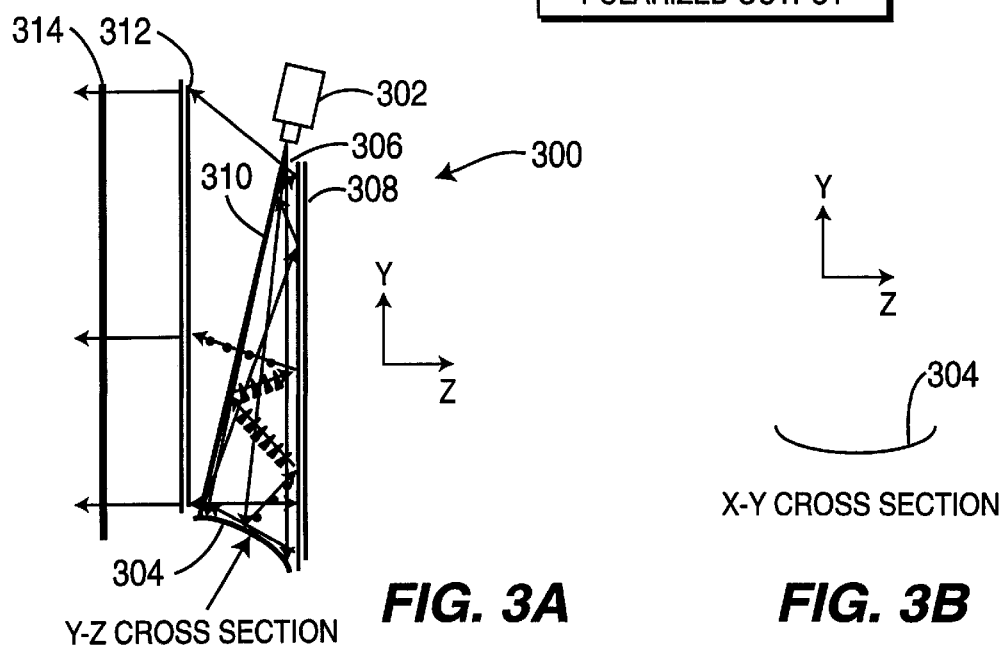
FIGS. 3A and 3B show a scanning projection system according to the principles of the invention.

A point source scanned system 300 according to the principles of the invention is shown in FIG. 3A. The system is shown in a Y-Z cross-section for ease of explanation. The point source scanning projector 302 is shown projecting toward a mirror 304 that reflects light to the quarter-wave retardation plate 306 and a second mirror 308. Light reflected from the second mirror 308 is directed to the polarization-dependent reflector 310 for eventual transmission by the screen 312. As in previously described embodiments, the screen can include a collimator for aligning desired light with a light control film 314. The mirror 308 is produced using GBO, as described with reference to FIG. 2, which causes the polarization directions of a ray propagating toward a point on the quarter-wave material 306 having non-zero X and Y coordinates to change.

Figure 4:
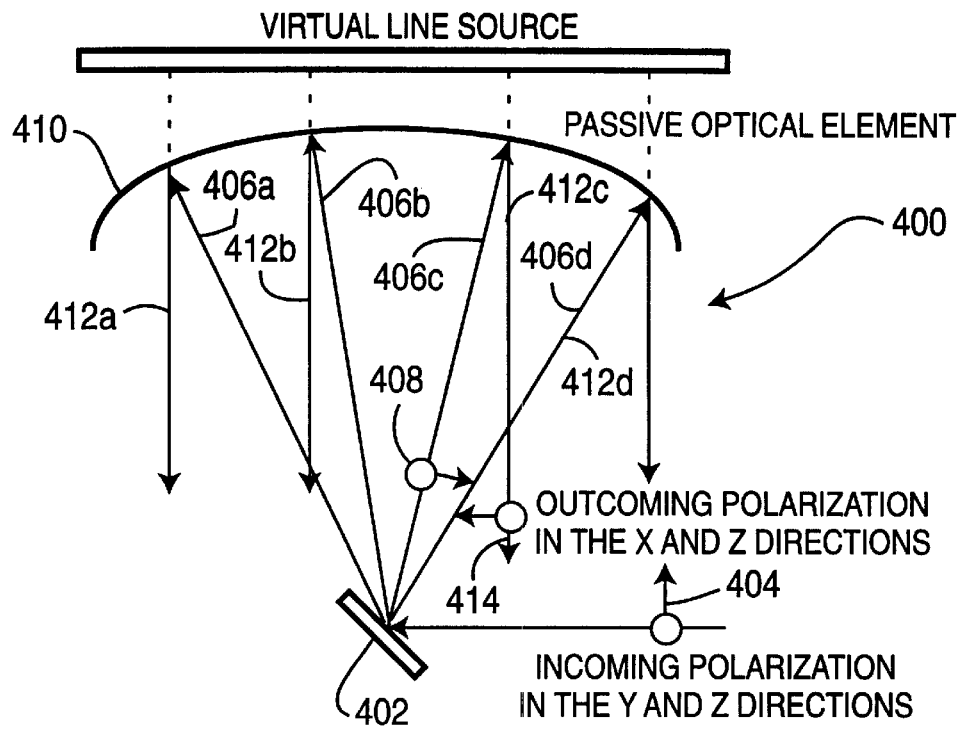
FIG. 4 illustrates a collimating projection source for the scanning projection system of FIGS. 3A and 3B.

The mirror 304 collimates the point source beamlets so that the light striking the mirror 304 projects properly upon the X and Y directions of the birefringent material. FIG. 3B shows a X-Y cross section of element 304. This collimating of the light into an effective line source is shown in detail in FIG. 4. In this ray trace 400, a scanning mirror 402 reflects light from a projection source (not shown). The light incident on the scanning mirror 402 is polarized in the Y and Z directions as indicated by the polarization state symbol 404. The reflected ray diverges into a beam represented by multiple rays 406a–d, as would be analogous to the divergence of a point source projection. The polarization of the scanned beam is represented for a typical ray 406c by a polarization state symbol 408. The rays strike a collimating optical element 410 that collimates the light 412a–d, resulting in effective line source projection. The polarization state of the collimated light 412a–d is shown by the polarization state symbol 414 for a typical ray 412c. The collimator optimally orients the polarization to minimize leakage through the system's birefringent elements.

In the system 300 of FIG. 3, the collimating element is the mirror 304, which has a saddle surface. The saddle surface implements a second cylindrical power that increases the effective field of the scan. For example, given a fifteen degree divergence from the source to the mirror 304, the second cylindrical power provides an effective 30 degree divergence angle, thereby increasing the vertical scan dimension. The same result is achievable with two cylindrical elements (mirrors or lenses), rather than one saddle shaped element. The magnification for these elements can be in one or two directions and need not be the same in both directions.

Figure 5:
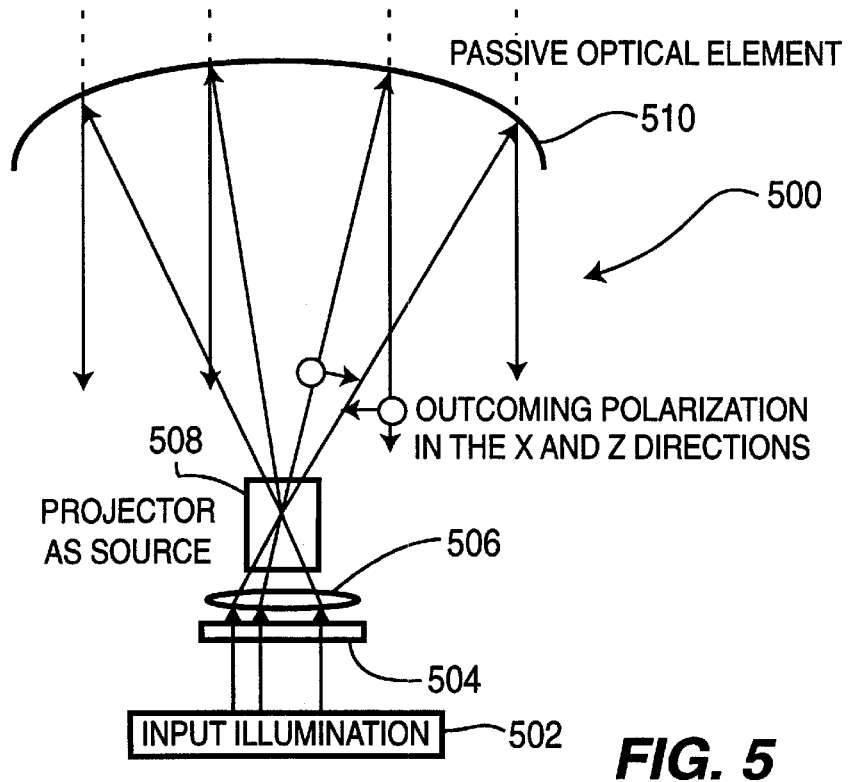
FIG. 5 shows another collimating projection source according to the principles of the invention.

Another collimated source 500 is shown in FIG. 5. In this configuration, an illumination source 502 illuminates a light valve 504. The output of the light valve 504 is received by a field lens 506, which establishes the field of projection. A second lens 508 is used to compensate for the magnification of the mirrors, including the diverging mirror 510, in the optical folder (not shown). The system can maintain differences in the magnification of the orthogonal directions that define the image, resulting in anamorphic projection. The light output of the diverging mirror 510 is an effective line source with correct polarization orientations for the dielectric mirror and polarization-dependent reflector in the optical folder. The foregoing descriptions are exemplary only, and are not intended to limit the scope of the invention. Modifications to these exemplary embodiments and substitutions for components in the exemplary embodiments may be apparent to one having ordinary skill in the art. For example, it should be apparent that different optical elements can substitute for each other, such as mirrors for lenses, without departing from the principles of the invention. Likewise, different polarization states, such as half-wave states, can be manipulated to achieve results according to the principles of the invention.

What is claimed is:

1. A rear projection system comprising:
   a projector operable to project light;
   an optical folder including a polarization-dependent reflector, the optical folder defining an optical path from the projector to a transmission screen, wherein the polarization-dependent reflector outputs light of a selected polarization state to the transmission screen;

a collimator optically responsive to the projector; and a light control film optically responsive to the collimator, wherein the light control film passes the collimated light.

2. The rear projection system of claim 1 wherein the light incident to the transmission screen is incident at an angle having a magnitude less than a critical angle magnitude.

3. The rear projection system of claim 1 wherein the transmission screen includes an off-axis Fresnel lens.

4. A rear projection system comprising:

a projector operable to project light;

an optical folder including a polarization-dependent reflector, the optical folder defining an optical path from the projector to a transmission screen, wherein the polarization-dependent reflector outputs light of a selected polarization state to the transmission screen;

a collimator optically responsive to the projector; and wherein the optical folder further includes at least one polarizing sheet interposed in the optical path, wherein the at least one polarizing sheet polarizes the projected light to a plurality of selected polarizations before the projected light passes through the polarization-dependent reflector, the selected polarizations including a reflectively polarized state and transmissively polarized state.

5. The rear projection system of claim 4 wherein the optical folder further includes:

a first mirror reflectively disposed to the projector and to a second mirror, the at least one polarizing sheet interposed between the first mirror and the second mirror, wherein the second mirror is reflectively disposed to the at least one polarizing sheet, the polarization-dependent reflector and the transmission screen.

6. The rear projection system of claim 5 wherein the at least one polarizing sheet is one selected from the group comprising quarter-wave sheets and half-wave sheets.

7. The rear projection system of claim 5 wherein the second mirror and the polarizing sheet are bonded.

8. The rear projection system of claim 7 wherein the polarizing sheet includes at least one bi-film layer.

9. The rear projection system of claim 8 wherein the second mirror comprises birefringent material.

10. The rear projection system of claim 4 wherein the at least one polarizing sheet comprises light orientation sensitive material.

11. The rear projection system of claim 10 wherein the at least one polarizing sheet comprises birefringent material.

12. The rear projection system of claim 4 wherein the at least one polarizing sheet comprises light orientation sensitive material.

13. The rear projection system of claim 12 wherein the polarization-dependent reflector comprises birefringent material.

14. A rear projection system comprising:

a scanning point source projector; and an optical folder defining an optical path from the scanning point source projector to a transmission screen, the optical folder including:

a collimator optically responsive to the scanning point source projector; and a polarization-dependent reflector optically responsive to the collimator, wherein the polarization-dependent reflector outputs light of a selected polarization state to the transmission screen.

15. The rear projection system of claim 14, the optical folder further including:

a mirror reflectively disposed to the collimator and to the polarization-dependent reflector; and a polarizing sheet optically disposed between the mirror and the polarization-dependent reflector, the polarizing sheet outputting selected polarization states to the polarization-dependent reflector.

16. The rear projection system of claim 14 wherein the collimator includes a mirror having a periphery defining a saddle surface.

17. The rear projection system of claim 14 further comprising anamorphic optics optically disposed to compensate for anamorphic optical effects induced by the optical folder.

18. The rear projection system of claim 17 wherein the anamorphic optics is optically interposed between the scanning point source projector and the collimator.

19. A method of rear projection comprising the step of:

projecting light in an optical path to a transmission screen;

in the optical path, polarizing the light to selected states, including at least one transmissive state and at least one reflective state;

reflecting light of the reflective state away from the transmission screen;

in the optical path, transmitting light of the transmissive state to the transmission screen;

collimating the light of the transmissive state; and absorbing the uncollimated light.

20. The method of claim 19, wherein light of the transmissive state is incident on the transmission screen at an incident angle having a magnitude less than a critical angle magnitude.

21. The method of claim 19, wherein the transmission screen includes an off-axis Fresnel lens.

22. A method of rear projection comprising the steps of:

projecting light in an optical path to a transmission screen;

in the optical path, collimating the light;

selecting a polarization state for the collimated light;

in the optical path, transmitting the collimated light in the selected state to the transmission screen; and absorbing the uncollimated light.

23. The method of claim 22, further comprising the step of:

in the optical path, selecting polarization states for the projected light, including reflective polarization states, and reflecting light incident in the reflective polarization states.

24. The method of claim 22, further including the step of optically compensating for anamorphic optical effects induced in the optical path.

* * * * *